United States Patent
Tajima et al.

(10) Patent No.: US 8,259,009 B2
(45) Date of Patent: Sep. 4, 2012

(54) RELATIVE POSITION DETECTING APPARATUS, AND RELATIVE POSITION DETECTING SYSTEM

(75) Inventors: Yasuhiro Tajima, Nisshin (JP); Kazunori Kagawa, Nagoya (JP); Masafumi Uchihara, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 161 days.

(21) Appl. No.: 12/989,007

(22) PCT Filed: Apr. 22, 2009

(86) PCT No.: PCT/IB2009/005320
§ 371 (c)(1),
(2), (4) Date: Oct. 21, 2010

(87) PCT Pub. No.: WO2009/130570
PCT Pub. Date: Oct. 29, 2009

(65) Prior Publication Data
US 2011/0037647 A1 Feb. 17, 2011

(30) Foreign Application Priority Data
Apr. 23, 2008 (JP) ................. 2008-112968

(51) Int. Cl.
*G01S 19/48* (2010.01)
(52) U.S. Cl. .................. 342/357.31
(58) Field of Classification Search .......... 342/357.31
See application file for complete search history.

(56) References Cited

U.S. PATENT DOCUMENTS

| 5,610,614 | A | 3/1997 | Talbot et al. |
| 6,259,398 | B1 | 7/2001 | Riley |
| 6,421,008 | B1 * | 7/2002 | Dybdal et al. .......... 342/424 |
| 2002/0032525 | A1 | 3/2002 | Yoshikawa et al. |
| 2002/0097181 | A1 | 7/2002 | Chou et al. |
| 2004/0145518 | A1 | 7/2004 | Toda et al. |

(Continued)

FOREIGN PATENT DOCUMENTS

EP 1 498 745 A2 1/2005

(Continued)

OTHER PUBLICATIONS

Japanese Office Action in Japanese Patent Application No. 2008-112968; dated Apr. 28, 2010 (with partial English-language translation).

(Continued)

*Primary Examiner* — Harry Liu
(74) *Attorney, Agent, or Firm* — Oliff & Berridge, PLC (57) ABSTRACT

In a case in which three or more movable objects, each of those detecting the relative position with respect to another movable object, are able to communicate with each other: a reference movable object obtains observation data and transmits the observation data to non-reference movable objects; one non-reference movable object calculates the relative position with respect to the reference movable object by performing interferometric positioning using the observation data obtained by the observation data obtaining means and data including observation data received from the reference movable object, and also transmits data including an integer bias calculated as interferometric positioning results to another non-reference movable object and receives reliability determination results regarding the interferometric positioning; and the another non-reference movable object receives data including the integer bias from the one non-reference movable object and determines the reliability of the interferometric positioning.

18 Claims, 4 Drawing Sheets

U.S. PATENT DOCUMENTS

| | | |
|---|---|---|
| 2005/0002481 A1 | 1/2005 | Woo et al. |
| 2005/0110676 A1 | 5/2005 | Heppe et al. |

FOREIGN PATENT DOCUMENTS

| | | |
|---|---|---|
| GB | 2 410 653 A | 8/2005 |
| JP | A-10-148665 | 6/1998 |
| JP | A-2001-337155 | 12/2001 |
| JP | A-2002-517731 | 6/2002 |
| JP | A-2003-270319 | 9/2003 |
| JP | A-2005-207894 | 8/2005 |
| WO | WO 98/37433 A1 | 8/1998 |
| WO | WO 2005/081013 A1 | 9/2005 |
| WO | WO 2007/111621 A1 | 10/2007 |
| WO | WO 2008/035139 A1 | 3/2008 |

OTHER PUBLICATIONS

Written Opinion of the International Searching Authority in International Application No. PCT/IB2009/005320; dated Apr. 16, 2010.
International Preliminary Report on Patentability in International Application No. PCT/IB2009/005320; dated Aug. 17, 2010.
International Search Report in International Application No. PCT/IB2009/005320; dated Apr. 16, 2010.

* cited by examiner

RELATIVE POSITION DETECTING APPARATUS, AND RELATIVE POSITION DETECTING SYSTEM

BACKGROUND OF THE INVENTION

1. Field of the Invention

The invention relates to a relative position detecting apparatus which is mounted in a movable object and detects the relative position of that movable object with respect to another moving object, as well as to a relative position detecting system made up of three or more movable objects each of which is provided with the relative position detecting apparatus.

2. Description of the Related Art

As related art, apparatuses that observe for satellite signals, obtain the observed data, and calculate the position of a movable object by performing a positioning calculation are used in vehicle navigation systems, marine vessels, and mobile phones and the like.

The main method of calculating the position is referred to as single point positioning. Single point positioning is a method which calculates pseudo ranges to a plurality of satellites based on the observed data obtained at a single observation point, and then calculates the position of the observation point according to the principle of triangulation.

However, a known method referred to as interferometric positioning that enables the position to be more precisely calculated is also being put into practical use. Interferometric positioning is a method which calculates the position of a measure point by obtaining a base vector from a known point to the measure point based on the observed data obtained at the observation point. Interferometric positioning uses a carrier phase with a short cycle compared to a C/A code that is normally used in single point positioning. Therefore, the frequency (i.e., the integer bias) from the satellite to the observation point must be specified.

Japanese Patent Application Publication No. 2003-270319 (JP-A-2003-270319), for example, describes an invention relating to this interferometric positioning. More specifically, JP-A-2003-270319 describes a method for calculating satellite positioning that involves the following steps. That is, for a satellite signal from the same satellite from which signals are received at a position on a reference side and a position on a positioning side (i.e., a measuring side), a relational expression between i) a carrier phase difference, ii) a carrier phase bias of an integer included in the carrier phase difference, iii) a phase difference between the positioning side and the reference side related to a reference phase by observation of the carrier phase, iv) the position of the satellite sending the satellite signal received by the reference side and the positioning side, and v) the positions of the reference side and the positioning side, is obtained. When relational expressions obtained at a plurality of observation timings are simultaneously satisfied, a conditional expression that defines the difference in the reference phase and the position on the positioning side is obtained and the condition obtained by this conditional expression is then substituted into the relational expression, such that an expression in which the variables corresponding to the difference in the reference phase and the position on the positioning side have been eliminated is obtained. Then the integer bias is obtained from the conditions that are satisfied with only a slight difference for this expression with no variables.

This method described in JP-A-2003-270319 is a method for calculating the integer bias between two points. However, when it is applied to a case in which three or more movable objects measure their relative positions, various problems arise. For example, when each of three or more movable objects measures its relative position with respect to the other movable objects, the communication and calculation loads increase. As a result, it may no longer possible to coordinate the positional relationships among the plurality of movable objects.

SUMMARY OF THE INVENTION

This invention thus provides a relative position detecting apparatus and a relative position detecting system capable of obtaining the relative positions of three or more movable objects using interferometric positioning, as well as efficiently determining the reliability of that interferometric positioning.

A first aspect of the invention relates to a relative position detecting apparatus which is mounted in one movable object and detects the relative position of the one movable object with respect to another movable object. This relative position detecting apparatus includes observation data obtaining means for obtaining observation data by observing a satellite signal, communicating means for communicating with the other movable object, positioning calculating means for performing a positioning calculation using the observation data obtained by the observation data obtaining means, and observation data received from the other movable object by the communicating means, and reliability determining means for determining the reliability of the results of the positioning calculation performed by the positioning calculating means. In a predetermined case in which three or more movable objects including the one movable object, one of the three or more movable objects being a reference movable object and the other two or more of the three or more movable objects being non-reference movable objects one of which is a first non-reference movable object and the other one or more of which is a second non-reference movable object, are able to communicate with each other: when the one movable object is the reference movable object, the communicating means transmits data that includes the observation data obtained by the observation data obtaining means to the other movable objects; when the one movable object is the second non-reference movable object, the positioning calculating means calculates the relative position of the one movable object with respect to the reference movable object by performing interferometric positioning that uses the obtained observation data and data that includes observation data received from the reference movable object, and the communicating means transmits data that includes an integer bias calculated in the interferometric positioning to the first non-reference movable objects, and receives the results from determining the reliability of the interferometric positioning based on the transmitted data that includes the integer bias from the first non-reference movable object; and when the one movable object is the first non-reference movable object, the positioning calculating means calculates the relative position of the one movable object with respect to the reference movable object by performing interferometric positioning using the obtained observation data and the data that includes observation data received from the reference movable object; the communicating means receives data that includes the integer bias from the second non-reference movable object; and the reliability determining means determines the reliability of the interferometric positioning based on the received data that includes the integer bias.

According to this structure, the relative positions among three or more movable objects can be obtained by interferometric positioning, and the reliability of the interferometric positioning can be efficiently determined.

In the relative position detecting apparatus according to the first aspect, it may be determined whether the one movable object is the reference movable object based on communication with the other movable objects.

Also, in the relative position detecting apparatus according to the first aspect, when the one movable object is one of the non-reference movable objects, it may be determined whether the one movable object is the first non-reference movable object or the second non-reference movable object based on communication with the other one or more non-reference movable objects.

A second aspect of the invention relates to a relative position detecting apparatus which is mounted in one movable object and detects the relative position of the one movable object with respect to another movable object. This relative position detecting apparatus includes observation data obtaining means for obtaining observation data by observing a satellite signal, communicating means for communicating with the other movable object, positioning calculating means for performing a positioning calculation using the observation data obtained by the observation data obtaining means, and observation data received from the other movable object by the communicating means, and reliability determining means for determining the reliability of the results of the positioning calculation performed by the positioning calculating means. In a predetermined case in which three or more movable objects, including the one movable object, one of the three or more movable objects being a reference movable object and the other two or more of the three or more movable objects being non-reference movable objects one of which is a first non-reference movable object and the other one or more of which is a second non-reference movable object, are able to communicate with each other and the one movable object is the reference movable object, the communicating means transmits data that includes the observation data obtained by the observation data obtaining means to the other movable objects. Also, in a predetermined case in which three or more movable objects including the one movable object, one of the three or more movable objects being a reference movable object and the other two or more of the three or more movable objects being non-reference movable objects one of which is a first non-reference movable object and the other one or more of which is a second non-reference movable object, are able to communicate with each other: when the one movable object is the reference movable object, the communicating means transmits data that includes the observation data obtained by the observation data obtaining means to the other movable objects; and when the one movable object is the second non-reference movable object, the positioning calculating means calculates the relative position of the one movable object with respect to the reference movable object by performing interferometric positioning using the obtained observation data and the data that includes observation data received from the reference movable object, and the reliability determining means performs a ratio test on the interferometric positioning, and if a ratio value of the performed ratio test is equal to or less than a predetermined value, the reliability determining means identifies the satellite signal related to the observation data responsible for lowering the ratio value and performs the ratio test again omitting the identified satellite signal.

According to this structure, if the reliability is unable to be confirmed by a ratio test, another ratio test is performed omitting the satellite responsible for lowering the ratio, so the reliability of the interferometric positioning can be improved.

In the relative position determining apparatus according to the second aspect, it may be determined whether the one movable object is the reference movable object based on communication with the other movable objects.

Also, in the relative position determining apparatus according to the second aspect, if the ratio value obtained is equal to or less than the predetermined value when the ratio test is performed again by the non-reference movable object that performed the ratio test again, the communicating means may transmit and receive observation data to and from the other one or more non-reference movable objects, and the reliability determining means may determine the reliability based on a comparison of i) the results of interferometric positioning regarding the relationship between the one movable object and the reference movable object, and ii) the results of the interferometric positioning regarding the relationship between the one movable object and the other one or more non-reference movable objects performed by the positioning calculating means or the results of the interferometric positioning performed by the other one or more non-reference movable objects. Alternatively, the communicating means may receive reliability determination results from one of the other one or more non-reference movable objects.

With this structure, it may be determined, based on communication with the other one or more non-reference movable objects, whether the results that are to be compared with the results of interferometric positioning regarding the relationship between the one movable object and the reference movable object are the results of interferometric positioning regarding the relationship between the one movable object and the other one or more non-reference movable objects or the results of interferometric positioning performed by the other one or more non-reference movable objects. Furthermore, the interferometric positioning regarding the relationship between the one movable object and the other one or more non-reference movable objects may use observation data of a satellite signal not used in the interferometric positioning regarding the relationship between the one movable object and the reference movable object.

A third aspect of the invention relates to a relative position detecting system that includes three or more movable objects each of which is provided with observation data obtaining means for obtaining observation data by observing a satellite signal, communicating means for communicating with the other movable objects, and positioning calculating means for performing a positioning calculation using the observation data obtained by the observation data obtaining means and observation data received from the other movable objects by the communicating means. In a predetermined case in which the three or more movable objects, one of the three or more movable objects being a reference movable object and the other two or more of the three or more movable objects being non-reference movable objects one of which is a first non-reference movable object and the other one or more of which is a second non-reference movable object, are able to communicate with each other: the reference movable object transmits data that includes the observation data obtained by the observation data obtaining means to the other movable objects; the positioning calculating means of the non-reference movable objects calculate the relative positions of the non-reference movable objects with respect to the reference movable object by performing interferometric positioning using the obtained observation data and data that includes observation data received from the reference movable object; the second non-reference movable object transmits data that includes an integer bias calculated in the interferometric positioning to the first non-reference movable objects and receives the results from determining the reliability of the interferometric positioning based on the transmitted data that includes the integer bias from the first non-reference movable object; and the first non-reference movable object receives the data that includes the integer bias from the second non-reference movable object, and determines the reliability of the interferometric positioning based on the received data that includes the integer bias.

According to this structure, the relative positions among three or more movable objects can be obtained by interferometric positioning, and the reliability of the interferometric positioning can be efficiently determined.

In the relative position detecting system according to this aspect, one of the movable objects may be determined to be the reference movable object and the other movable objects may be determined to be the non-reference movable objects by the three or more movable objects that make up the relative position detecting system communicating with each another.

Also, in the relative position detecting system according to this aspect, it may be determined, for each of the non-reference movable objects, whether the non-reference movable object is the first non-reference movable object or the second non-reference movable object by the non-reference movable objects communicating with each other.

A fourth aspect of the invention relates to a relative position detecting system that includes three or more movable objects each of which is provided with observation data obtaining means for obtaining observation data by observing a satellite signal, communicating means for communicating with the other movable objects, and positioning calculating means for performing a positioning calculation using the observation data obtained by the observation data obtaining means and observation data received from the other movable objects by the communicating means. In a predetermined case in which the three or more movable objects, one of the three or more movable objects being a reference movable object and the other two or more of the three or more movable objects being non-reference movable objects one of which is a first non-reference movable object and the other one or more of which is a second non-reference movable object, are able to communicate with each other: the reference movable object transmits data that includes the observation data obtained by the observation data obtaining means to the other movable objects; and one of the non-reference movable objects uses the positioning calculating means to calculate the relative position of the non-reference movable object with respect to the reference movable object by performing interferometric positioning using the obtained observation data and data that includes the observation data received from the reference movable object, and performs a ratio test on the interferometric positioning, and if the ratio value of the performed ratio test is equal to or less than a predetermined value, identifies the satellite signal related to the observation data responsible for lowering the ratio value and performs the ratio test again omitting the identified satellite signal.

According to this structure, if the reliability is unable to be confirmed by a ratio test, another ratio test is performed omitting the satellite responsible for lowering the ratio, so the reliability of the interferometric positioning can be improved.

In the relative position detecting system according to this aspect, one of the movable objects may be determined to be the reference movable object and the other movable objects may be determined to be the non-reference movable objects by the three or more movable objects that make up the relative position detecting system communicating with each another.

Also, in the relative position detecting system according to this aspect, if the ratio value obtained is equal to or less than the predetermined value when the ratio test is performed again by the non-reference movable object that performed the ratio test again, the non-reference movable object may transmit and receive observation data to and from the other one or more non-reference movable objects, perform interferometric positioning regarding the relationship with the other one or more non-reference movable objects, and make a reliability determination based on a comparison of i) the results of interferometric positioning regarding the relationship with the reference movable object, and ii) the results of the performed interferometric positioning or the results of the interferometric positioning performed by the other one or more non-reference movable objects, or receive reliability determination results from the one of the other one or more non-reference movable objects.

With this structure, the non-reference movable objects may communicate with each other and each non-reference movable object may determine whether to perform interferometric positioning regarding the relationship with the other one or more non-reference movable objects or have one of the other one or more non-reference movable objects perform interferometric positioning. Further, observation data of a satellite signal not used in the interferometric positioning regarding the relationship with the reference movable object may be used in the interferometric positioning regarding the relationship with the other one or more non-reference movable objects.

This invention makes it possible to provide a relative position detecting apparatus and a relative position detecting system capable of obtaining the relative positions of three or more movable objects using interferometric positioning, as well as efficiently determining the reliability of that interferometric positioning.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF EMBODIMENTS

Example embodiments of the present invention will be described in greater detail below with reference to the accompanying drawings.

Figure 1:
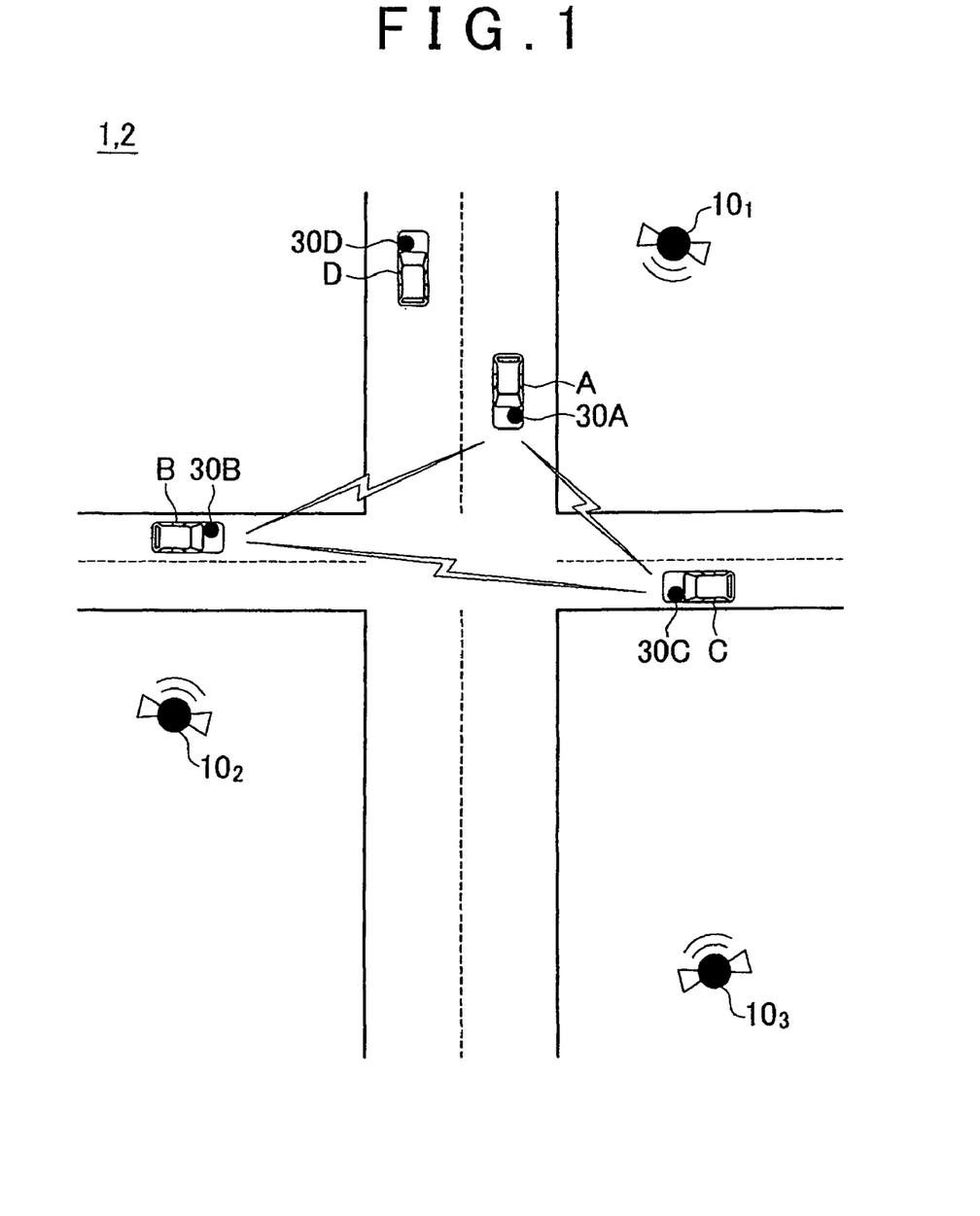
FIG. 1 is a view showing a frame format of the system structure of a relative position detecting system according to a first example embodiment of the invention.

Hereinafter, a relative position detecting system 1 according to a first example embodiment of the invention will be described. FIG. 1 is a view showing a frame format of the system structure of the relative position detecting system 1. This relative position detecting system 1 is formed by a relative position detecting apparatus 30A, 30B, 30C, ... being mounted in each of three or more movable objects (in this description these movable objects are vehicles) A, B, C, .... Each vehicle detects its relative position among the vehicles by receiving a satellite signal sent from a plurality of GPS (Global Positioning System) satellites $10_k$ (k=1, 2, ... ) and performing a positioning calculation. Incidentally, other examples of movable objects include, but are not limited to, two-wheeled motor vehicles, trains, marine vessels, aircraft, forklifts, robots, and information terminals such as mobile phones that move with a person.

Each GPS satellite orbits the earth and constantly transmits navigation messages. These navigation messages include, for example, information pertaining to the orbit of the GPS satellite, a clock correction value, a correction coefficient for the ionosphere, and a health message and the like. The navigation messages are constantly being transmitted toward Earth, and are dispersed by C/A code and transmitted on a L1 carrier (which is on a frequency of 1575.42 MHz).

Incidentally, there are currently 24 GPS satellites in operation orbiting the globe at altitudes of approximately 20,000 km. The GPS satellites are arranged evenly in six different orbital planes around the earth, each inclined 55 degrees to the equator, with four GPS satellites in each orbital plane. Therefore, at least five GPS satellites can be observed at any given time anywhere on earth as long as it is an area where the sky is visible.

Figure 2:
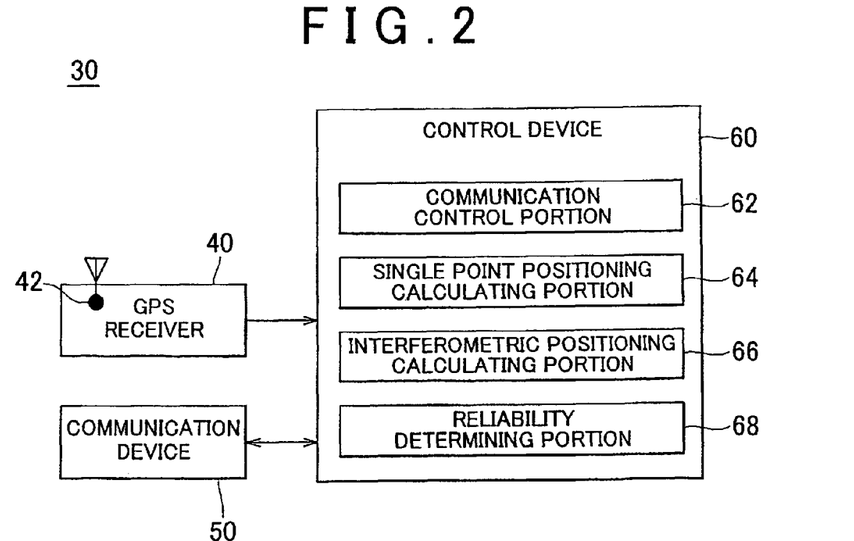
FIG. 2 is a view showing an example structure of a relative position detecting apparatus according to the first example embodiment of the invention.

Each vehicle is provided with a relative position detecting apparatus 30 (the reference characters A, B, C, ... for distinguishing the vehicles are omitted here). FIG. 2 is a view showing an example structure of the relative position detecting apparatus 30. This relative position detecting apparatus 30 includes a GPS receiver 40, a communication device 50, and a control device 60. Here, the GPS receiver 40 is an example of observation data obtaining means of the invention, and the communication device 50 is an example of communicating means of the invention.

The GPS receiver 40 houses an oscillator, not shown, the frequency of which matches the carrier frequency of a GPS satellites 10. The GPS receiver 40 converts the signal received from each GPS satellite (i.e., the satellite signal) by a GPS antenna 42 into an intermediate frequency and then performs C/A code synchronization using a C/A code generated in the GPS receiver 40 to retrieve a navigation message.

The GPS receiver 40 measures an integrated value $\Phi_k(t)$ of a carrier phase at time t, as shown in the expression below, based on a carrier from the GPS satellite $10_k$. The carrier phase integrated value $\Phi_k$ may also be measured for both the L1 wave and a L2 wave (which is on a frequency of 1227.6 MHz). In the expression, $N_k$ is an integer bias, $\tau_k$ is the travel time from the GPS satellite $10_k$ to the GPS receiver 40, and $\epsilon_k$ is noise (error).

$$\Phi_k(t)=\Theta_k(t)-\Theta_k(t-\tau_k)+N_k+\epsilon_k(t) \quad (1)$$

Also, the GPS receiver 40 measures a pseudo range $\rho_k$, as shown in the expression below, based on the C/A code transmitted on each carrier from the GPS satellite $10_k$. In the expression, c is the speed of light and $b_k$ is the clock bias which corresponds to the range error due to clock error within a GPS receiver 44.

$$\rho_k(t)=c\times\tau_k+b_k \quad (2)$$

The communication device 50 is a device that communicates with other vehicles. For example, the communication device 50 transmits and receives information to and from other vehicles using a frequency band of 5.8 GHz that is used with DSRC (Dedicated Short Range Communication). However, the invention is not limited to this. For example, the communication device 50 may also communicate wirelessly using a beacon or the like, or communicate wirelessly by means of a short range radio communication system such as Bluetooth (registered trademark). The communication device 50 decodes the signals and the like received from the other vehicles and outputs the obtained information to the control device 60.

The control device 60 is a microcomputer that is centered around a CPU (central processing unit), and in which the CPU, ROM (Read-Only Memory), and RAM (Random Access Memory) and the like are bilaterally connected together via a bus, for example. The control device 60 also includes a storage device such as a HDD (Hard Disc Drive) or DVD (Digital Versatile Disk) drive, a CD (Compact Disc) drive, or flash memory, as well as I/O ports, a timer, and a counter, and the like. Data as well as programs to be executed by the CPU are stored in the ROM. Also, the control device 60 has, as main functional blocks that function by the CPU executing the programs stored in the ROM, a communication control portion 62, a single point positioning calculating portion 64, an interferometric positioning calculating portion 66, and a reliability determining portion 68. Here, the single point positioning calculating portion 64 and the interferometric positioning calculating portion 66 are examples of positioning calculating means of the invention.

Incidentally, these functional blocks do not have to be clearly based on different programs. Portions that realize a plurality of functional blocks may be included in the same program. Also, all of some of the functions of the control device 60 may also integrated into the GPS receiver 40 or the communication device 50.

In a predetermined situation in which communication is possible with two or more other vehicles, the communication control portion 62 communicates with the other vehicles and assigns a role of (1) a reference vehicle, (2) a non-reference vehicle (in charge of making a reliability determination), or (3) a non-reference vehicle (not in charge of making the reliability determination) to each of the three of more vehicles including the host vehicle. Only one vehicle assumes the role of the reference vehicle and only one vehicle assumes the role of the non-reference vehicle (in charge of making the reliability determination). The specific method by which the roles are assigned is not particularly limited. That is, any one of various methods may be used. For example, the vehicle that initiates a call may be designated as the reference vehicle, and the vehicle that replies first may be designated as the non-reference vehicle (in charge of making the reliability determination), while the vehicle that replies later may be designated as the non-reference vehicle (not in charge of making the reliability determination).

The single point positioning calculating portion 64, the interferometric positioning calculating portion 66, and the reliability determining portion 68 either perform processing or do not perform processing depending on the role assumed by the vehicle (i.e., the host vehicle). Therefore, the processing of each functional block will be described in view of the role of each vehicle.

Figure 3:
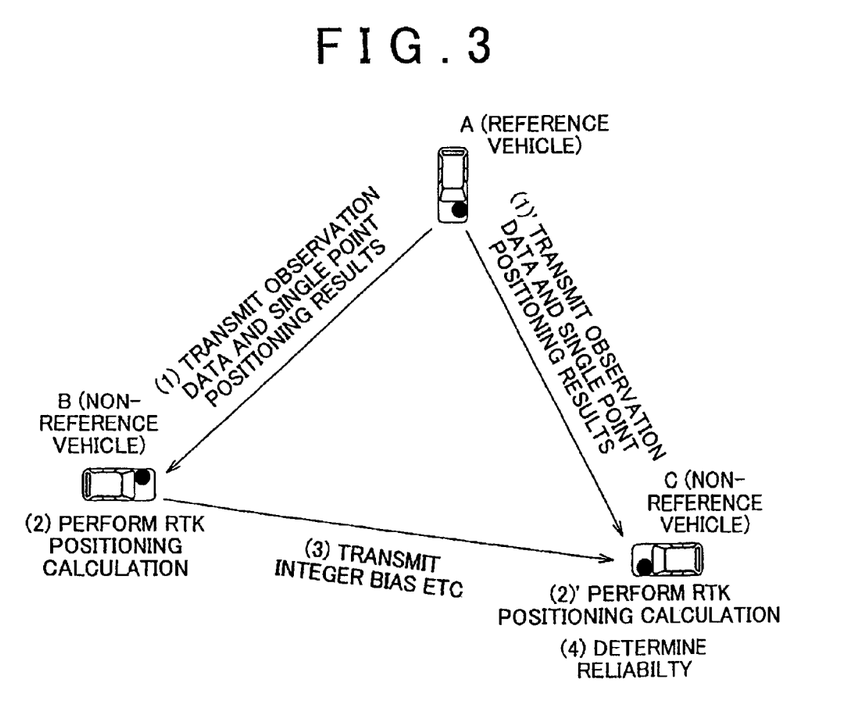
FIG. 3 is a view showing how processing performed by vehicles is shared in the relative position detecting system according to the first example embodiment of the invention.

FIG. 3 is a view showing how the processing performed by the vehicles is shared in the relative position detecting system 1. In the following description, vehicle A will be the reference vehicle, vehicle B will be the non-reference vehicle (not in charge of making the reliability determination), and vehicle C will be the non-reference vehicle (in charge of making the reliability determination). Also, the data of the pseudo range $\rho_k$ and the phase integrated value $\Phi_k$ measured by the GPS receiver 40 will be collectively referred to as "observation data" when necessary, and the data of the phase integrated value $\Phi_k$ will be referred to as "L1 data" and "L2 data" corresponding to the L1 wave and the L2 wave, respectively. Also, the data of the pseudo range $\rho_k$ will be referred to as "C/A data".

Figure 4:
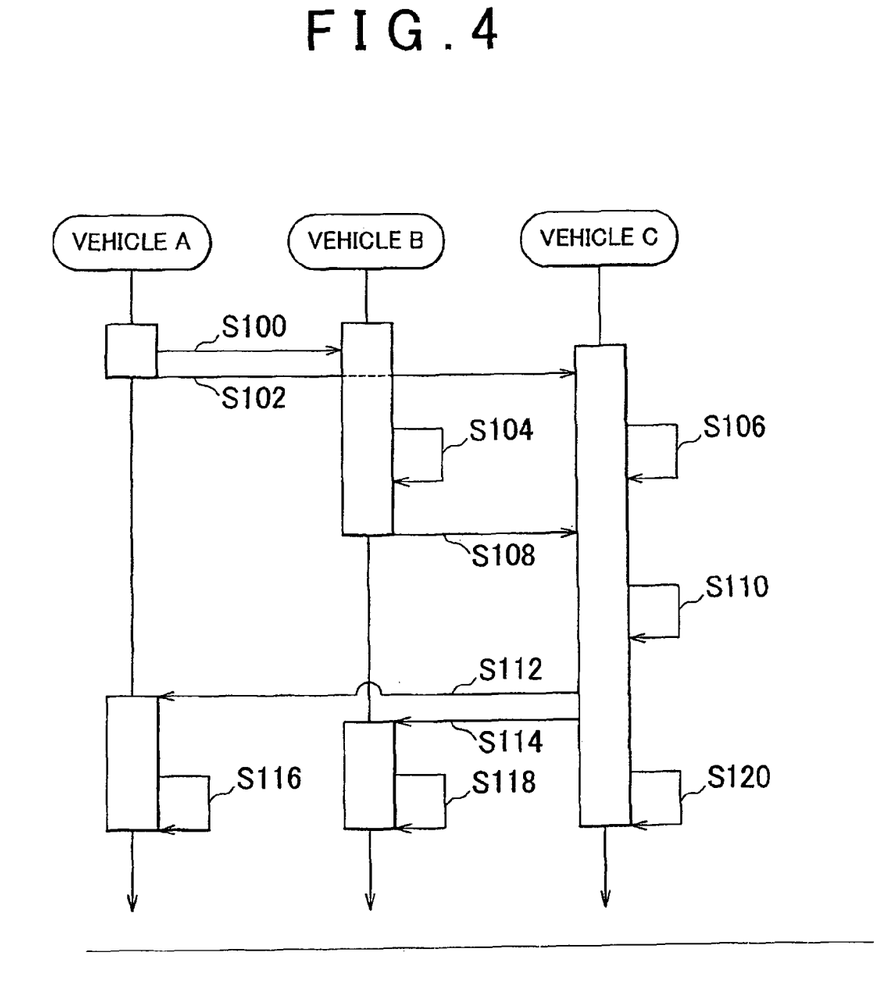
FIG. 4 is a sequential diagram showing the flow of processing performed by the vehicles in the relative position detecting system according to the first example embodiment of the invention.

Also, FIG. 4 is a sequential diagram showing the flow of the processing performed by the vehicles (i.e., the relative position detecting apparatuses mounted in the vehicles, hereinafter simply omitted) in the relative position detecting system 1. The step numbers in the following description correspond to the step numbers in the drawing.

The reference vehicle A transmits the L1 data, the L2 data, and the C/A data of the five satellites, as well as the position $x_A$ of the vehicle according to single point positioning calculated by the single point positioning calculating portion 64, together with the receiving time of the signals upon which these calculations are based, to the non-reference vehicles B and C (S100 and S102). The single point positioning calculating portion 64 then calculates the position of the host vehicle by single point positioning using the pseudo ranges $\rho_k$ to at least four GPS satellites $10_k$ measured by the GPS receiver 40. A description of the position calculation by single point positioning is well known by those skilled in the art and so will be omitted here. Incidentally, when the position $x_A$ of the vehicle using the pseudo ranges $\rho_k$ is to be calculated in the non-reference vehicles B and C, the transmission of the position $x_A$ of the vehicle by single point positioning from the reference vehicle A may be omitted.

In the non-reference vehicle B, the interferometric positioning calculating portion 66 performs a RTK positioning calculation of one sample of data based on observation data (L1 data and L2 data) of the five satellites measured by the GPS receiver 40 of the non-reference vehicle B in synchronization with the receiving time received from the reference vehicle A, and observation data received from the reference vehicle A, and then calculates a vector $X_{AB}$, and a double phase difference $N^{jh}{}_{AB}$ of an integer bias (S104). Incidentally, the superscript j and h represent a selected two of the five satellites. The receiving time synchronization is performed using a GPS time or a PSS signal or the like.

In the non-reference vehicle C as well, the interferometric positioning calculating portion 66 similarly performs a RTK positioning calculation of one sample of data based on observation data (L1 data and L2 data) measured by the GPS receiver 40 of the non-reference vehicle C in synchronization with the receiving time received from the reference vehicle A, and observation data received from the reference vehicle A, and then calculates a vector $X_{AC}$, and a double phase difference $N^{jh}{}_{AC}$ of an integer bias (S106). The RTK positioning calculation is one type of interferometric positioning.

Here, an overview of the RTK positioning calculations performed in the non-reference vehicles B and C will be given, but to simplify the description, only the calculation performed in the non-reference vehicle B will be described.

The interferometric positioning calculating portion 66 of the non-reference vehicle B calculates the double phase difference $N^{jh}{}_{AB}$ of the integer bias and the phase position (vector $X_{AB}$) of the non-reference vehicle B with respect to the reference vehicle A according to the least squares method, with the double phase difference $\Phi^{jh}{}_{AB}$ of the observation data as the observation quantity and the position $X_B$ of the non-reference vehicle B and the double phase difference $N^{jh}{}_{AB}$ of the integer bias as state variables. Hereinafter, to simplify the description, a case in which only the L1 data is used will be described. However, when the L2 data is used, the phase integrated value of the L2 wave may be added in the same manner as the phase integrated value of the L1 wave.

First, the double phase difference of the phase integrated value relating to two paired GPS satellites $10_j$ and $10_h$ (j≠h) and the vehicles A and B at a given time t are obtained according to Expression (3) below.

$$\Phi^{jh}{}_{AB}=(\Phi^j{}_A(t)-\Phi^j{}_B(t))-(\Phi^h{}_A(t)-\Phi^h{}_B(t)) \quad (3)$$

The double phase difference $\Phi^{jh}{}_{AB}$ of the phase integrated value here becomes as follows due to the physical implications of (distance between the GPS satellite and the GPS receiver)=(wavelength L of the carrier)×(phase integrated value).

$$\Phi^{jh}_{AB} = \frac{\left\{\begin{array}{l}\left(\sqrt{\left(\frac{X_A(t)-}{X_j(t)}\right)^2+\left(\frac{Y_A(t)-}{Y_j(t)}\right)^2+\left(\frac{Z_A(t)-}{Z_j(t)}\right)^2}-\right.\\ \left.\sqrt{\left(\frac{X_B(t)-}{X_j(t)}\right)^2+\left(\frac{Y_B(t)-}{Y_j(t)}\right)^2+\left(\frac{Z_B(t)-}{Z_j(t)}\right)^2}\right)-\\ \left(\sqrt{\left(\frac{X_A(t)-}{X_h(t)}\right)^2+\left(\frac{Y_A(t)-}{Y_h(t)}\right)^2+\left(\frac{Z_A(t)-}{Z_h(t)}\right)^2}-\right.\\ \left.\sqrt{\left(\frac{X_B(t)-}{X_h(t)}\right)^2+\left(\frac{Y_B(t)-}{Y_h(t)}\right)^2+\left(\frac{Z_B(t)-}{Z_h(t)}\right)^2}\right)\end{array}\right\}}{L+N^{jh}_{AB}+\varepsilon^{jh}_{AB}} \quad (4)$$

Here, $[X_A(t), Y_A(t), Z_A(t)]$ in Expression (4) is a coordinate value on a world coordinate system of the reference vehicle A at time t. A value calculated by single point positioning can be used for the reference vehicle A. Also, $[X_B(t), Y_B(t), Z_B(t)]$ is a coordinate value (unknown) of the non-reference vehicle B at time 1, and $[X_j(t), Y_j(t), Z_j(t)]$ and $[X_h(t), Y_h(t), Z_h(t)]$ are coordinate values of the GPS satellites $10_j$ and $10_h$, respectively, at time t. Also, $N^{jh}{}_{AB}$ is a double phase difference of the integer bias and satisfies Expression (5) below.

$$N^{jh}{}_{AB}=(N^j{}_A-N^j{}_B)-(N^h{}_A-N^h{}_B) \quad (5)$$

Also, the double phase difference of the pseudo range related to the GPS satellites $10_j$ and $10_h$ (j≠h) at time t is obtained according to Expression (6) below.

$$\rho^{jh}{}_{AB}=(\rho_{jA}(t)-\rho_{jB}(t))-(\rho_{hA}(t)-\rho_{hB}(t)) \quad (6)$$

The double phase difference $\rho^{jh}{}_{AB}$ of the pseudo range can also be expressed as shown in Expression (7) below.

$$\rho^{jh}_{AB} = \left\{\begin{array}{l}\left(\sqrt{\left(\frac{X_A(t)-}{X_j(t)}\right)^2+\left(\frac{Y_A(t)-}{Y_j(t)}\right)^2+\left(\frac{Z_A(t)-}{Z_j(t)}\right)^2}-\right.\\ \left.\sqrt{\left(\frac{X_B(t)-}{X_j(t)}\right)^2+\left(\frac{Y_B(t)-}{Y_j(t)}\right)^2+\left(\frac{Z_B(t)-}{Z_j(t)}\right)^2}\right)-\\ \left(\sqrt{\left(\frac{X_A(t)-}{X_h(t)}\right)^2+\left(\frac{Y_A(t)-}{Y_h(t)}\right)^2+\left(\frac{Z_A(t)-}{Z_h(t)}\right)^2}-\right.\\ \left.\sqrt{\left(\frac{X_B(t)-}{X_h(t)}\right)^2+\left(\frac{Y_B(t)-}{Y_h(t)}\right)^2+\left(\frac{Z_B(t)-}{Z_h(t)}\right)^2}\right)\end{array}\right\} \quad (7)$$

The terms $[X_A(t), Y_A(t), Z_A(t)]$, $[X_B(t), Y_B(t), Z_B(t)]$, $[X_j(t), Y_j(t), Z_j(t)]$, and $[X_h(t), Y_h(t), Z_h(t)]$ in Expression (7) are the same as they are in Expression (4).

Then the relationship between the observation quantity Z (i) and the state variable η (i) can be expressed by the linear model shown below.

$$Z(i) = H(i) \times \eta(i) + V(i) \qquad (8)$$

Here, V is the observation noise, and η (i) represents the state variable of the observation cycle i (=1, 2, ... ) and is a double phase difference of the integer bias and the coordinate value (unknown) of the non-reference vehicle B. For example, when there are four pairs (j, h) of paired GPS satellites 10, e.g., (1, 2), (1, 3), (1, 4), and (1, 5), $\eta = [X_B, Y_B, Z_B, N^{12}_{AB}, N^{13}_{AB}, N^{14}_{AB}, N^{15}_{AB}]^T$ (where $^T$ indicates transposition). The observation quantity Z in Expression (8) is the double phase difference $\Phi^{jh}_{AB}$ of the phase integrated value and the double phase difference $\rho^{jh}_{AB}$ of the pseudo range. For example, when there are four pairs (j, h) of paired GPS satellites 10, e.g., (1, 2), (1, 3), (1, 4), and (1, 5), $Z = [\Phi^{12}_{AB}, \Phi^{13}_{AB}, \Phi^{14}_{AB}, \Phi^{15}_{AB}, \rho^{12}_{AB}, \rho^{13}_{AB}, \rho^{14}_{AB}, \rho^{15}_{AB}]^T$.

Here, the observation equation of Expression (8) is linear, but the observation quantity Z in Expressions (4) and (7) is nonlinear regarding the state variables $X_B, Y_B$, and $Z_B$. Therefore, the terms in Expressions (4) and (7) are each partially differentiated by the state variables $X_B, Y_B$, and $Z_B$ to obtain the observation matrix H in Expression (8) above. For example, when there are four pairs (j, h) of paired GPS satellites 10, e.g., (1, 2), (1, 3), (1, 4), and (1, 5), the observation matrix H is as shown below.

$$H = \begin{bmatrix} H_1 \\ H_2 \end{bmatrix} = \begin{bmatrix} \frac{\partial Z_{1AB}^{12}}{\partial X_B} & \frac{\partial Z_{1AB}^{12}}{\partial Y_B} & \frac{\partial Z_{1AB}^{12}}{\partial Z_B} & 1 & & & \\ \cdot & \cdot & \cdot & & 1 & & \\ \cdot & \cdot & \cdot & & & 1 & \\ \frac{\partial Z_{1AB}^{15}}{\partial X_B} & \frac{\partial Z_{1AB}^{15}}{\partial Y_B} & \frac{\partial Z_{1AB}^{15}}{\partial Z_B} & & & & 1 \\ \frac{\partial Z_{2AB}^{12}}{\partial X_B} & \frac{\partial Z_{2AB}^{12}}{\partial Y_B} & \frac{\partial Z_{2AB}^{12}}{\partial Z_B} & & & & \\ \cdot & \cdot & \cdot & & & 0 & \\ \cdot & \cdot & \cdot & & & & \\ \frac{\partial Z_{2AB}^{15}}{\partial X_B} & \frac{\partial Z_{2AB}^{15}}{\partial Y_B} & \frac{\partial Z_{2AB}^{15}}{\partial Z_B} & & & & \end{bmatrix} \qquad (9)$$

The term $H_1$ in Expression (9) is an observation matrix when the observation quantity $Z_1 = [\Phi^{12}_{AB}, \Phi^{13}_{AB}, \Phi^{14}_{AB}, \Phi^{15}_{AB}]^T$. The term $H_2$ in Expression (9) is an observation matrix when the observation quantity $Z_2 = [\rho^{12}_{AB}, \rho^{13}_{AB}, \rho^{14}_{AB}, \rho^{15}_{AB}]^T$. The observation matrix H incorporates both of these two observation matrixes $H_1$ and $H_2$.

When Expression (8) above is solved by the least squares method using the observation matrix H in Expression (9), the real root (i.e., the float root) of η (i) can be obtained as shown below.

$$\eta(i) = (H^T(i) \times H(i))^{-1} \times H^T(i) \times Z(i) \qquad (10)$$

The interferometric positioning calculating portion 66 also calculates the integer solution of the integer bias, i.e., the double phase difference $N^{jh}_{AB}$ of the integer bias, based on the real root (i.e., the float root) of the integer bias calculated as described above. More specifically, the interferometric positioning calculating portion 66 obtains the integer root (i.e., the wave number) with the smallest error with respect to the calculated real root, for example, as a first candidate, and then obtains the integer solution with the next smallest error as the second candidate. The LAMBDA method, which solves a problem by decorrelating the integer bias and narrowing the search domain of the integer solution, may also be used for this method. Alternatively, instead of the LAMBDA method, an integer solution may be derived by the least squares method of another integer or by rounding off.

According to this process, the coordinate $x_B$ of the non-reference vehicle B in which the coordinate of the reference vehicle A is a known value can be obtained, so the vector $X_{AB}$ can be obtained. Also, the double phase difference $N^{jh}_{AB}$ of the integer bias can be obtained. In this example embodiment, the RTK positioning calculation is performed using one sample of data, so it is expected that the processing will be easy and quick compared to when a RTK positioning calculation is performed in time series using a Kalman filter or the like.

When the non-reference vehicle B calculates the vector $X_{AB}$ and the double phase difference $N^{jh}_{AB}$ of the integer bias, and the non-reference vehicle C calculates the vector $X_{AC}$ and the double phase difference $N^{jh}_{AC}$ of the integer bias, the vector $X_{AB}$, the double phase difference $N^{jh}_{AB}$ of the integer bias of two (i.e., a pair of) satellites, and a single phase difference $\Phi^{jh}_B (= \Phi^j_B - \Phi^h_B)$ of the phase integrated value related to the same pair of satellites are transmitted from the non-reference vehicle B to the non-reference vehicle C (S108).

Then, the reliability determining portion 68 in the non-reference vehicle C determines the reliability (i.e., makes a reliability determination) (S110). This reliability determination is made based on whether Expression (11) below is satisfied. If Expression (11) is satisfied, the reliability of the calculated double phase difference of the integer bias is high so it can be determined that the reliability of the calculated relative positions among vehicles A, B, and C is high. In the expression, $\Phi^{jh}_{BC}$ is the double phase difference $(= \Phi^{jh}_B - \Phi^{jh}_C)$ of the phase integrated value, λ is the wavelength (approximately 20 [cm]) of the carrier, and α is a predetermined value set in advance to a value equal to or less than 2/λ (such as approximately 5 to 10 [cm]). Incidentally, f $(x_B, x_C)$ is expressed by Expression (12). The coordinate $x_B$ of the non-reference vehicle B is obtained by adding the vector $X_{AB}$ to the coordinate $x_A$ of the reference vehicle A. Also, the coordinate $x_c$ of the non-reference vehicle C is obtained by adding the vector $X_{AC}$ to the coordinate $x_A$ of the reference vehicle A.

$$|\Phi^{jh}_{BC} - \{f(x_B, x_C) + \lambda(N^{jh}_{AB}, N^{jh}_{AC})\}| < a \qquad (11)$$

$$f(x_B, x_C) = [\sqrt{\{(x_B - x_j)\}^2} - \sqrt{\{(x_B - x_h)\}^2}] - [\sqrt{\{(x_C - x_j)\}^2} - \sqrt{\{(x_C - x_h)\}^2}] \qquad (12)$$

The non-reference vehicle C then transmits the results of the reliability determination to the reference vehicle A and the non-reference vehicle B (S112 and S114). If the determination results obtained by the non-reference vehicle C indicate high reliability, the integer solution is fixed in the vehicles (S116, S118, and S120), and then the relative positions among the vehicles are calculated by RTK positioning calculations using that integer solution. If, on the other hand, the determination results obtained by the non-reference vehicle C indicate low reliability, the integer solution is not fixed in the vehicles. Instead, interim measures are taken, e.g., the relative positions are tentatively calculated using the last obtained integer solution.

According to this process, the reliability of the integer bias can be efficiently determined when three or more vehicles detect their relative positions by the RTK positioning calculation. The data transmitted from the non-reference vehicle B to the non-reference vehicle C is the vector $X_{AB}$, the double phase difference $N^{jh}_{AB}$ of the integer bias of two (i.e., a pair of) satellites, and a single phase difference $\Phi^{jh}_{B}$ of the phase integrated value related to the same pair of satellites. However, when performing the RTK positioning calculation between vehicles B and C, the position of either one of the vehicles according to single point positioning must be transmitted when necessary, in addition to the phase integrated values of at least five satellites. Also, the processing load of the RTK positioning calculation itself is relatively large.

Therefore, the communication and processing loads can be reduced compared to what they are when determining the reliability by performing RTK positioning calculations between vehicles A and B, between vehicles A and C, and between vehicles B and C, and then performing a ratio test or the like. Also, there is no bothersome processing that is otherwise required when there is a discrepancy between the results from performing the RTK positioning calculations between vehicles A and B, between vehicles A and C, and between vehicles B and C.

Accordingly, the relative position detecting system 1 and the relative position detecting apparatus 30 that makes up this relative position detecting system 1 in this example embodiment are able to obtain the relative positions among three or more movable objects by interferometric positioning, and efficiently determine the reliability of the interferometric positioning.

Hereinafter, a relative position detecting system 2 according to a second example embodiment of the invention will be described. This relative position detecting system 2 is realized by the same hardware structure as the first example embodiment and will therefore be described with reference to the description of the first example embodiment and FIGS. 1 and 2. Also, descriptions of the hardware of the constituent elements and the technical background will be omitted.

Similar to the first example embodiment, the control device 60 according to this example embodiment has the communication control portion 62, the single point positioning calculating portion 64, the interferometric positioning calculating portion 66, and the reliability determining portion 68.

In a predetermined situation in which communication is possible with two or more other vehicles, the communication control portion 62 communicates with the other vehicles and assigns a role of (1) a reference vehicle or (2) a non-reference vehicle to the three of more vehicles including the host vehicle.

The single point positioning calculating portion 64 and the interferometric positioning calculating portion 66 have the same functions as they do in the first example embodiment. That is, the single point positioning calculating portion 64 calculates the position of the host vehicle by single point positioning, and the interferometric positioning calculating portion 66 calculates the relative position of the host vehicle with respect to the reference vehicle and the double phase difference of the integer bias regarding the relationship with the reference vehicle when the host vehicle is a non-reference vehicle.

Similar to the first example embodiment, in the system 2 of this example embodiment as well, the non-reference vehicle performs a RTK positioning calculation using i) the received data, i.e., the L1 data, the L2 data, and the C/A data of the five satellites, and the position of the vehicle according to single point positioning calculated by the single point positioning calculating portion 64, which are all transmitted from the reference vehicle to the non-reference vehicle, and ii) the observation data observed by the non-reference vehicle, and calculates its relative position (vector) with respect to the reference vehicle and the double phase difference of the integer bias regarding the relationship with the reference vehicle. Then the non-reference vehicle performs a ratio test or the like to determine the reliability of the RTK positioning calculation. Hereinafter, the reference vehicle will be designated by the letter A and the non-reference vehicles will be designated by the letters B and C.

Figure 5:
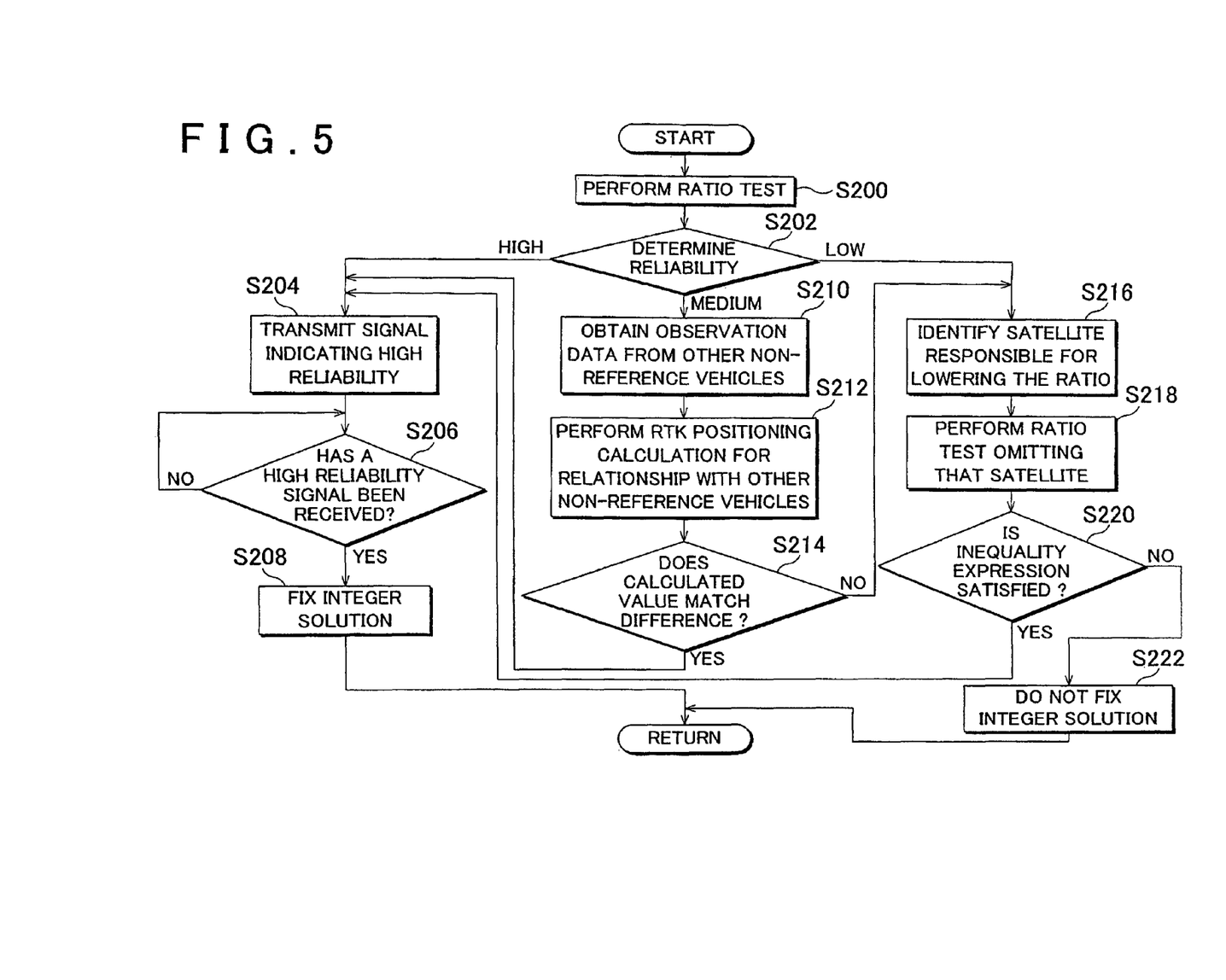
FIG. 5 is a flowchart illustrating the flow of a process executed by a control apparatus (mainly a reliability determining portion) of a non-reference vehicle according to a second example embodiment of the invention, which is executed after performing a RTK positioning calculation.

FIG. 5 is a flowchart illustrating the flow of the process executed by the control apparatuses 60 (mainly the reliability determining portions 68) of the non-reference vehicles after performing the RTK positioning calculation. Here, only the process of the non-reference vehicle B will be described.

First, the reliability determining portion 68 performs a ratio test (S200) on the integer bias $N^{jh}_{AB}$ calculated by the interferometric positioning calculating portion 66.

The ratio test is performed as described below. For example, a case will be assumed in which there are four pairs (j, h) of paired GPS satellites 10, e.g., (1, 2), (1, 3), (1, 4), and (1, 5), and the real roots of four integer biases ($n^{12}$, $n^{13}$, $n^{14}$, and $n^{15}$) and the first candidates ($N^{12}_1$, $N^{13}_1$, $N^{14}_1$, and $N^{15}_1$) and second candidates ($N^{12}_2$, $N^{13}_2$, $N^{14}_2$, and $N^{15}_2$) of integer solutions of the integer biases are calculated. In this case, the ratio R is a ratio of i) the range (norm) between the real root of the integer bias and the first candidate of the integer solution of the integer bias to ii) the range between the real root of the integer bias and the second candidate of the integer solution of the integer bias, as shown below. The ratio R is typically indicates that the reliability of the first candidate of the integer solution of the integer bias increases as the value increases.

$$R = \{(n^{12}-N^{12}_2)^2 + (n^{13}-N^{13}_2)^2 + (n^{14}-N^{14}_2)^2 + (n^{15}-N^{15}_2)^2\} / \{(n^{12}-N^{12}_1)^2 + (n^{13}-N^{13}_1)^2 + (n^{14}-N^{14}_1)^2 + (n^{15}-N^{15}_1)^2\} \quad (13)$$

Then the ratio R is compared with predetermined values $\beta_1$ and $\beta_2$ and the reliability is determined from among three levels, i.e., high, medium, and low (S202). That is, if the ratio R is equal to or greater than the predetermined value $\beta_1$ (e.g., a value of approximately 3), the reliability is determined to be high. If the ratio R is equal to or greater than the predetermined value $\beta_2$ (e.g., approximately 1.5) but less than the predetermined value $\beta_1$, the reliability is determined to be medium. If the ratio R is less than the predetermined value $\beta_2$, the reliability is determined to be low.

If the reliability is high, a signal indicating such is transmitted to the other non-reference vehicle C (S204). If a signal indicating that the reliability as determined by the non-reference vehicle C is high is also received from the non-reference vehicle C, it is determined that the integer solutions of the integer biases calculated by the non-reference vehicles B and C this time are correct and those integer solutions are fixed in the vehicles. Then the relative positions among the vehicles are calculated by RTK positioning calculations using those integer solutions (S206 and S208).

If, on the other hand, the reliability is medium, the observation data of the non-reference vehicle C is requested and obtained (S210). Then, the interferometric positioning calculating portion 66 is instructed to perform a RTK positioning calculation for the relationship between the host vehicle and the reference vehicle C (S212). Moreover, it is determined whether the calculated double phase difference $N^{jh}_{BC}$ of the integer bias matches the difference between $N^{jh}_{AB}$ and $N^{jh}_{AC}$ (S214). If the double phase difference of the integer bias matches that difference, then the reliability is regarded as being high and a signal indicating such is transmitted to the other non-reference vehicle C (S204).

If it is determined in step S202 that the reliability is low, and it is determined in step S214 that the double phase difference of the integer bias does not match, the satellite responsible for lowering the ratio R is identified (S216). More specifically, ratio tests are performed sequentially omitting one of the pairs (1, 2), (1, 3), (1, 4), and (1, 5) in the example give above. If the ratio R increases to equal to or greater than a predetermined value when a given pair, e.g., (1, 3), is omitted, it is determined that the corresponding satellite, i.e., the third satellite in this case, is responsible for lowering the ratio R.

The reliability is determined by comparing the ratio R calculated by the ratio test performed with the identified satellite omitted with the predetermined values $\beta_1$ and $\beta_2$ (S218). If the reliability here is high, the reliability is regarded as being high and a signal indicative of such is, transmitted to the other non-reference vehicle C (S204).

If in step S218 the reliability is medium or low, it is determined whether the inequality expression of Expression (11) described in the first example embodiment is satisfied (S220) using the phase integrated value $\Phi^{jh}_{BC}$ calculated according to the observation data obtained in step S212 (i.e., by requesting and obtaining the observation data of the non-reference vehicle C when step S212 is not performed). In this case, the observation data for the satellite for which the radio signal was not observed with the reference vehicle A may be reflected in the phase integrated value $\Phi^{jh}_{BC}$. Also, Expression (11) is calculated by selecting two satellites so any pair of satellites, except for the satellite that was identified in step S216, is selected. If the inequality expression in Expression (11) is satisfied, the reliability is regarded as being high so a signal indicating such is transmitted to the other non-reference vehicle C (S204).

If the determination in step S220 is No, it is determined that the currently calculated integer bias is unreliable so the signal indicating that the reliability is high is not transmitted from the non-reference vehicle B to the non-reference vehicle C (S222). That is, the integer solution of the integer bias is not fixed. In this case, interim measures are taken such as continuing to use the previously calculated integer bias.

According to the relative position detecting system 2 of this example embodiment, if the reliability is unable to be confirmed by a ratio test, another ratio test is performed omitting the satellite responsible for lowering the ratio R, so the reliability of the interferometric positioning can be improved.

While the invention has been described with reference to example embodiments thereof, it is to be understood that the invention is not limited to the example embodiments or constructions. Various modifications and substitutions are also possible without departing from the scope of the invention.

For example, in the example embodiments, the real root of the integer bias is obtained by an instantaneous positioning method. However, there are many methods for calculating the real root of the integer bias so a method other than that described above may be used. For example, a method may also be used which uses only the double phase difference of the phase integral value and does not use the double phase difference of the pseudo range.

Also, when the GPS receiver is a two frequency receiver capable of receiving both L1 and L2 waves (L2 being on a frequency of 1227.6 MHz) transmitted from a GPS satellite, the double phase difference of the phase integrated value for the L2 wave may be used additionally or alternatively as the observation quantity Z. Also, the double phase difference of a phase integrated value for a carrier of another band (such as the radio waves of an L5 band planned to be added in the future) may be used additionally or alternatively as the observation quantity Z. Similarly, with the double phase difference of a pseudo range as well, a single or double phase difference of a pseudo range based on a similar PRN code (pseudorandom noise code) other than a C/A code (such as a P code) may be used additionally or alternatively as the observation quantity Z. With the method for calculating the root solution of the integer bias described above, the effects from the clock error and the initial phase of the oscillator in the GPS receiver and the like are eliminated by using the double phase difference as described above, but a single phase difference may also be used. Also, in the method described above, the ionospheric layer refraction effect, the tropospheric refraction effect, and the multipath effect are ignored, but they may also be taken into account.

Moreover, in the first example embodiment, after the non-reference vehicle C determines that the reliability is low, it may request and obtain the observation data of the non-reference vehicle. B, perform interferometric positioning regarding the relationship between the non-reference vehicle B and the host vehicle, and determine whether the calculated double phase difference $N^{jh}_{BC}$ of the integer bias matches the difference between $N^{jh}_{AB}$ and $N^{jh}_{AC}$, just as in steps S212 and 214 in the second example embodiment. If it matches, the reliability may be regarded as being high.

Also, in the example embodiments described above, the invention is applied to GPS. However, the invention may also be applied to a satellite system other than GPS, such as another GNSS (Global Navigation Satellite System) such as Galileo, for example.

While some embodiments of the invention have been illustrated above, it is to be understood that the invention is not limited to details of the illustrated embodiments, but may be embodied with various changes, modifications or improvements, which may occur to those skilled in the art, without departing from the spirit and scope of the invention.

The invention may be used in automotive manufacturing and automotive parts manufacturing and the like.

The invention claimed is:

1. A relative position detecting apparatus which is mounted in one movable object and configured to detect the relative position of the one movable object with respect to another movable object, comprising:
   an observation data obtaining unit that obtains observation data by observing a satellite signal;
   a communicating unit that communicates with the other movable object;
   a positioning calculating unit that performs a positioning calculation using the observation data obtained by the observation data obtaining unit, and observation data received from the other movable object by the communicating unit; and
   a reliability determining unit that determines the reliability of the results of the positioning calculation performed by the positioning calculating unit,
   wherein, in a predetermined case in which three or more movable objects including the one movable object communicate with each other, the relative position detecting apparatus is configured to assign to one of the three or more movable objects a status of being a reference movable object and the other two or more of the three or more movable objects being non-reference movable objects one of which is a first non-reference movable object and the other one or more of which is a second non-reference movable object, wherein in the predetermined case, when the relative position detecting apparatus is mounted in the one movable object having the status of being the reference movable object, the communicating unit is configured to transmit data that includes the observation data obtained by the observation data obtaining unit to the other movable objects;

when the relative position detecting apparatus is mounted in a movable object having the status of being the second non-reference movable object, the positioning calculating unit is configured to calculate the relative position of the one movable object with respect to the reference movable object by performing interferometric positioning that uses the obtained observation data and data that includes observation data received from the reference movable object, wherein the communicating unit is configured to transmit data that includes an integer bias calculated in the interferometric positioning performed by the positioning calculating unit of the second non-reference movable object to the first non-reference movable objects; and when the relative position detecting apparatus is mounted in the one movable object having the status of being the first non-reference movable object, the positioning calculating unit is configured to calculate the relative position of the one movable object with respect to the reference movable object by performing interferometric positioning using the obtained observation data and the data that includes observation data received from the reference movable object; the communicating unit is configured to receive data that includes the integer bias from the second non-reference movable object; the reliability determining unit is configured to determine the reliability of the interferometric positionings performed by each of the first non-reference movable object and the second non-reference movable object based on the received data that includes the integer bias and the data that includes an integer bias calculated in the interferometric positioning performed by the positioning calculation unit, and the reliability determining unit is configured to transmit the determined reliability to the reference movable object and the second non-reference movable object.

2. The relative position detecting apparatus according to claim 1, wherein the relative position detecting apparatus is configured to assign the status of being the reference movable object to the one movable object based on communication with the other movable objects.

3. The relative position detecting apparatus according to claim 1, wherein when the one movable object is one of the non-reference movable objects, it is determined whether the one movable object is the first non-reference movable object or the second non-reference movable object based on communication with the other one or more non-reference movable objects.

4. A relative position detecting apparatus which is mounted in one movable object and configured to detect the relative position of the one movable object with respect to another movable object, comprising:

an observation data obtaining unit that obtains observation data by observing a satellite signal;

a communicating unit that communicates with the other movable object;

a positioning calculating means that performs a positioning calculation using the observation data obtained by the observation data obtaining unit, and observation data received from the other movable object by the communicating unit; and a reliability determining unit that determines the reliability of the results of the positioning calculation performed by the positioning calculating unit, wherein, in a predetermined case in which three or more movable objects including the one movable object communicate with each other, the relative position detecting apparatus is configured to assign to one of the three or more movable objects a status of being a reference movable object and the other two or more of the three or more movable objects a status of being non-reference movable objects one of which is a first non-reference movable object and the other one or more of which is a second non-reference movable object, wherein in the predetermined case, when the relative position detecting apparatus is mounted in the one movable object having the status of being the reference movable object, the communicating unit is configured to transmit data that includes the observation data obtained by the observation data obtaining unit to the other movable objects;

when the relative position detecting apparatus is mounted in a movable object having the status of being the second non-reference movable object, the positioning calculating unit is configured to calculate the relative position of the one movable object with respect to the reference movable object by performing interferometric positioning using the obtained observation data and the data that includes observation data received from the reference movable object, and the reliability determining unit is configured to perform a ratio test on the interferometric positioning which ratio test is based on pairs of signals received from different ones of the satellites, and if a ratio value of the performed ratio test is equal to or less than a predetermined value, the reliability determining unit is configured to identify the satellite signal related to the observation data responsible for lowering the ratio value and to perform the ratio test again omitting the identified satellite signal, wherein if the ratio value obtained is equal to or less than the predetermined value when the ratio test is performed again by the non-reference movable object that performed the ratio test again, the communication unit is configured to transmit and receive observation data to and from the other one or more non-reference movable objects, to perform interferometric positioning regarding the relationship with the other one or more non-reference movable objects, and the reliability determining unit determines the reliability i) based on a comparison of the results of interferometric positioning regarding the relationship between the one movable object and the reference movable object and the results of the performed interferometric positioning regarding the relationship between the one movable object and the other one or more non-reference movable objects performed by the position calculating unit, or ii) based on a comparison of the results of interferometric positioning regarding the relationship between the one movable object and the reference movable object and the results of the interferometric positioning performed by the other one or more non-reference movable objects, or iii) based on reliability determination results received by the communicating unit from the one of the other one or more non-reference movable objects.

5. The relative position detecting apparatus according to claim 4, wherein the relative position detecting apparatus is configured to assign the status of being the reference movable object to the one movable object based on communication with the other movable objects.

6. The relative position detecting apparatus according to claim 4, wherein it is determined, based on communication with the other one or more non-reference movable objects, whether the results that are to be compared with the results of interferometric positioning regarding the relationship between the one movable object and the reference movable object are the results of interferometric positioning regarding the relationship between the one movable object and the other one or more non-reference movable objects or the results of interferometric positioning performed by the other one or more non-reference movable objects.

7. The relative position detecting apparatus according to claim 4, wherein the interferometric positioning regarding the relationship between the one movable object and the other one or more non-reference movable objects uses observation data of a satellite signal not used in the interferometric positioning regarding the relationship between the one movable object and the reference movable object.

8. The relative position detecting apparatus according to claim 5, wherein the interferometric positioning regarding the relationship between the one movable object and the other one or more non-reference movable objects uses observation data of a satellite signal not used in the interferometric positioning regarding the relationship between the one movable object and the reference movable object.

9. The relative position detecting apparatus according to claim 6, wherein the interferometric positioning regarding the relationship between the one movable object and the other one or more non-reference movable objects uses observation data of a satellite signal not used in the interferometric positioning regarding the relationship between the one movable object and the reference movable object.

10. A relative position detecting system comprising:
three or more movable objects each of which is provided with observation data obtaining unit that obtains observation data by observing a satellite signal, communicating unit that communicates with the other movable objects, and positioning calculating unit that performs a positioning calculation using the observation data obtained by the observation data obtaining unit and observation data received from the other movable objects by the communicating unit,
wherein, in a predetermined case in which the three or more movable objects communicate with each other, one of the three or more movable objects is configured to have a status of being a reference movable object and the other two or more of the three or more movable objects are configured to have a status of being non-reference movable objects, wherein one of which has a status of a first non-reference movable object and the other one or more of which has a status of a second non-reference movable object, wherein:
the communication unit of the reference movable object is configured to transmit data that includes the observation data obtained by the observation data obtaining unit to the other movable objects;
the positioning calculating unit of the non-reference movable objects are configured to calculate respective relative positions of the non-reference movable objects with respect to the reference movable object by performing interferometric positioning using the obtained observation data and data that includes observation data received from the reference movable object;
the communication unit of the second non-reference movable object is configured to transmit data that includes an integer bias calculated in the interferometric positioning performed by the positioning calculating unit of the second non-reference movable object to the first non-reference movable objects; and
the first non-reference movable object is configured to receive the data that includes the integer bias from the second non-reference movable object, and to determine the reliability of the interferometric positionings performed by each of the first non-reference movable object and the second non-reference movable object based on the received data that includes the integer bias and the data that includes an integer bias calculated in the interferometric positioning performed by the positioning calculation unit, wherein the first non-reference movable object is configured to transmit the determined reliability to the reference movable object and the second non-reference movable object.

11. The relative position detecting system according to claim 10, wherein one of the movable objects is determined to be the reference movable object and the other movable objects are determined to be the non-reference movable objects by the three or more movable objects that make up the relative position detecting system communicating with each another.

12. The relative position detecting system according to claim 10, wherein it is determined, for each of the non-reference movable objects, whether the non-reference movable object is the first non-reference movable object or the second non-reference movable object by the non-reference movable objects communicating with each other.

13. The relative position detecting system according to claim 11, wherein it is determined, for each of the non-reference movable objects, whether the non-reference movable object is the first non-reference movable object or the second non-reference movable object by the non-reference movable objects communicating with each other.

14. A relative position detecting system comprising:
three or more movable objects each of which is provided with observation data obtaining unit that obtains observation data by observing a satellite signal, communicating unit that communicates with the other movable objects, and positioning calculating unit that performs a positioning calculation using the observation data obtained by the observation data obtaining unit and observation data received from the other movable objects by the communicating unit,
wherein, in a predetermined case in which the three or more movable objects communicate with each other, one of the three or more movable objects is configured to have a status of being a reference movable object and the other two or more of the three or more movable objects are configured to have a status of being non-reference movable objects, wherein one of which has a status of a first non-reference movable object and the other one or more of which has a status of a second non-reference movable object, wherein:
the communication unit of the reference movable object is configured to transmit data that includes the observation data obtained by the observation data obtaining unit to the other movable objects;

the positioning calculating unit of the non-reference movable objects are configured to calculate respective relative positions of the non-reference movable objects with respect to the reference movable object by performing interferometric positioning using the obtained observation data and data that includes observation data received from the reference movable object, wherein said one of the non-reference movable objects is further configured to perform a ratio test on the interferometric positioning, which ratio test is based on pairs of signals received from different ones of the satellites, and if the ratio value of the performed ratio test is equal to or less than a predetermined value, said one of the non-reference movable objects is further configured to identify the satellite signal related to the observation data responsible for lowering the ratio value and to perform the ratio test again omitting the identified satellite signal, wherein if the ratio value obtained is equal to or less than the predetermined value when the ratio test is performed again by the non-reference movable object that performed the ratio test again, the communicating unit is configured to transmit and receive observation data to and from the other one or more non-reference movable objects, and the reliability determining unit determines the reliability i) based on a comparison of the results of interferometric positioning regarding the relationship between the one movable object and the reference movable object and the results of the interferometric positioning regarding the relationship between the one movable object and the other one or more non-reference movable objects performed by the positioning calculating unit, or ii) based on a comparison of the results of interferometric positioning regarding the relationship with the reference movable object and the results of the interferometric positioning performed by the other one or more non-reference movable objects, or iii) based on reliability determination results received by the communicating unit from one of the other one or more non-reference movable objects.

15. The relative position detecting system according to claim 14, wherein one of the movable objects is determined to be the reference movable object and the other movable objects are determined to be the non-reference movable objects by the three or more movable objects that make up the relative position detecting system communicating with each another.

16. The relative position detecting system according to claim 14, wherein the non-reference movable objects communicate with each other and each non-reference movable object determines whether to perform interferometric positioning regarding the relationship with the other one or more non-reference movable objects or have one of the other one or more non-reference movable objects perform interferometric positioning.

17. The relative position detecting system according to claim 14, wherein observation data of a satellite signal not used in the interferometric positioning regarding the relationship with the reference movable object is used in the interferometric positioning regarding the relationship with the other one or more non-reference movable objects.

18. The relative position detecting system according to claim 16, wherein observation data of a satellite signal not used in the interferometric positioning regarding the relationship with the reference movable object is used in the interferometric positioning regarding the relationship with the other one or more non-reference movable objects.

* * * * *